UNITED STATES PATENT OFFICE.

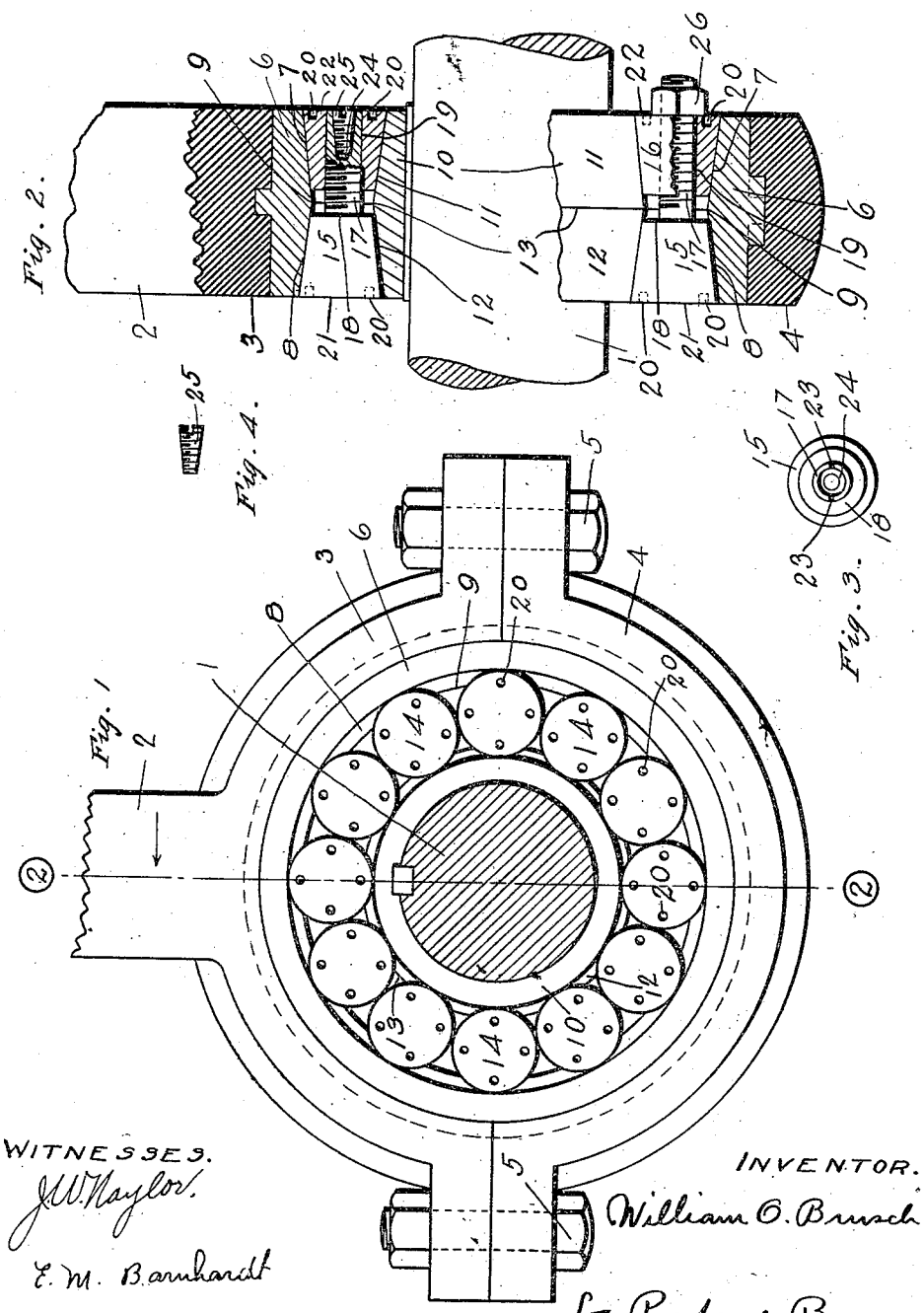

WILLIAM O. BRUSCH, OF PEORIA, ILLINOIS.

BEARING.

1,065,660.  Specification of Letters Patent.  Patented June 24, 1913.

Application filed September 30, 1911. Serial No. 652,218.

*To all whom it may concern:*

Be it known that I, WILLIAM O. BRUSCH, citizen of the United States, residing at Peoria, in the county of Peoria and State of Illinois, have invented certain new and useful Improvements in Bearings, of which the following is a specification.

This invention relates to improvements in bearings and has for one of its objects the provision of a roller bearing wherein the rollers are formed in sections adjustable relatively to each other.

A further object of the invention is the provision of a bearing wherein rollers are utilized, said rollers being formed of frusto-conical sections, the sections of each roller being capable of relative adjustment to take up wear.

A further object is the provision of a bearing which will give efficient service for a considerable time with a minimum of wear and in which any wear may be compensated for and the parts held tightly in a properly adjusted position.

To the accomplishment of the foregoing and such other objects as may hereinafter appear, my invention consists in the combination, construction and arrangement of parts and details, hereinafter described and then sought to be defined in the appended claim, reference being had to the accompanying drawings forming a part hereof and which illustrate merely a preferred embodiment of my inventive idea, it being understood that the detailed construction and arrangement may be varied in practice within the scope of the claim without digressing from my invention.

In the drawings, Figure 1 is an end view of a bearing between a crank shaft and a connecting rod which bearing is constructed according to my invention. Fig. 2 is a cross-section of Fig. 1 and taken substantially on line 2—2, parts being shown in elevation.
Fig. 3 is an end view of one section of a roller showing the split stud. Fig. 4 is an elevation of a detail.

Referring to the drawings, 1 designates a crank shaft, 2 a connecting rod, 3 the yoke on upper part of the ring and 4 the separable part of the ring which is secured to the yoke 3 by the bolts 5, as shown and it is to be understood that these parts are shown and described merely to illustrate one application of my invention, which, as should be well understood, is of general utility and applicability. Secured in the connecting yoke or ring 3 and 4 is the hardened ring or bearing plate 6 which has its inner surface formed with the two oppositely and outwardly inclined surfaces 7 and 8 which meet in the central ridge 9. A hardened ring or bearing plate 10 of smaller diameter than the ring 6 is secured to the shaft 1; said ring 10 having the two oppositely and outwardly inclined surfaces 11 and 12 which meet in the central ridge 13. In the annular space between these hardened rings 6 and 10 are positioned the rollers 14. These rollers are each formed of two parts or sections 15 and 16, the body portions of each section being frusto-conical in shape and of substantially the same size, the incline of the cone being the same as the inclination of the surfaces 7 and 8, and 11 and 12, so that all of the surfaces of the sections of the rollers will bear on said inclined surfaces and thereby provide a considerable and extended bearing surface for the bearing. The section or part 15 of each roller is provided with the screw threaded stud or extension 17 which projects from the smaller end 18 of the frusto-conical body of said section. A bore or passage 19 internally screw threaded to correspond to said stud 17, is formed in the section or part 16 of each roller. Recesses 20 are provided in the outer end and larger ends 21 and 22 of the frusto-conical bodies of each part or section of the rollers, in which a spanner or other suitable tool is adapted to engage to assemble and adjust the parts or sections 15 and 16 of each roller in proper relation for efficient service.

Various means may be utilized for locking the parts or sections of each roller in a properly adjusted position, two of such means being illustrated. In the case of the uppermost roller in Fig. 2 of the drawings, the end of the stud 17 is split as at 23 and is further provided with a conical recess 24 which is internally screw threaded to receive an expanding or locking pin 25, which, as shown in detail in Fig. 4, is a frusto-conical and externally screw threaded member. After the parts or sections have been properly adjusted relatively to each other, the pin 25 is screwed into the recess 24, forcing the portions of the split end of the stud apart to tightly bind and lock the parts together. In the lower roller shown in Fig. 2, the same result is attained by extending the stud 17 and applying a nut 26 thereto. Where there is sufficient space the latter construction may be used, but where there is no room for the extended stud and nut to operate in, the first construction should be utilized.

My invention, therefore, provides a simple bearing construction with an extended bearing surface. This is advantageous in that it does not concentrate all of the pressure and weight at one point, but distributes it, thereby preventing rapid and excessive wear and doing away with the necessity of frequently renewing or repairing the various parts. Further than that an efficient and simple means for adjusting and regulating the parts is provided, whereby any wear may be readily compensated for and the parts always held in the proper relative position for the most effective action.

What I claim is:—

In a bearing, rollers made in frusto-conical sections, said sections being disposed with their smaller ends adjacent one of said sections being formed integrally with a stud or extension projecting from its smaller end, and said stud or extension being screw threaded and having its end split and formed with an inwardly tapered screw threaded opening, the other section having a screw threaded bore adapted to receive said screw threaded stud or extension whereby the sections may be adjusted relatively to each other, and an externally screw threaded locking pin adapted to be screwed into said screw threaded opening to lock the parts in adjusted position the outer face of said locking pins being flush with the outer of said second mentioned sections.

In testimony whereof I affix my signature, in presence of two witnesses.

WILLIAM O. BRUSCH.

Witnesses:
G. E. MEIERS,
L. NOLAN.